A. B. REPETTO.
SAW SET.
APPLICATION FILED AUG. 25, 1916.
1,239,217.
Patented Sept. 4, 1917.
2 SHEETS—SHEET 1.
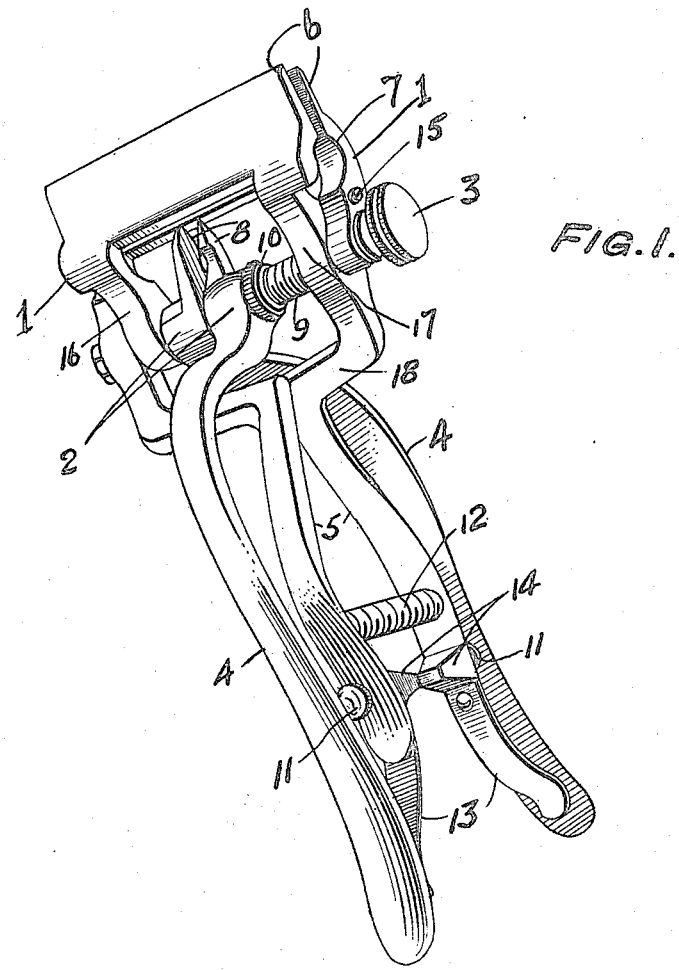
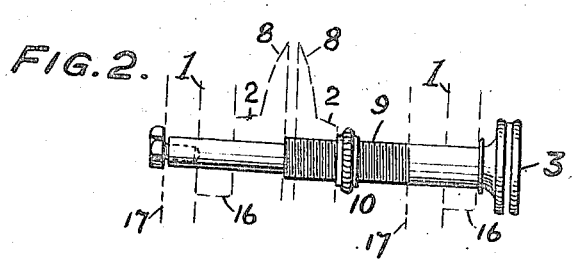
WITNESS:
Rob't R. Kitchel
INVENTOR
Augustine B. Repetto
BY
Augustus B. Stoughton
ATTORNEY.

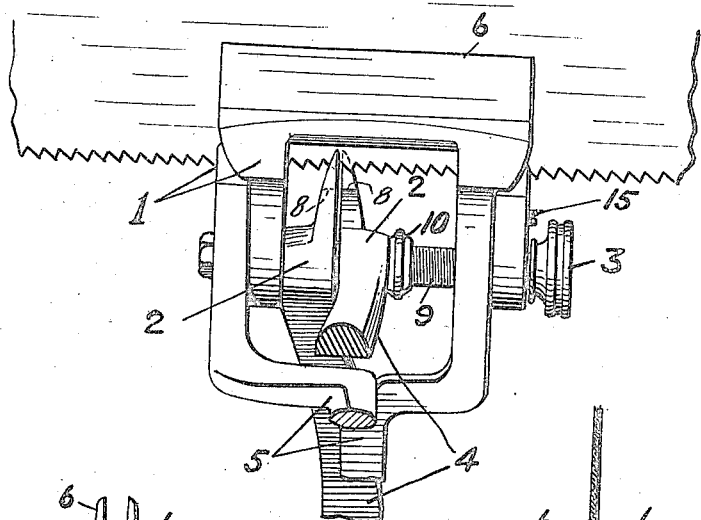
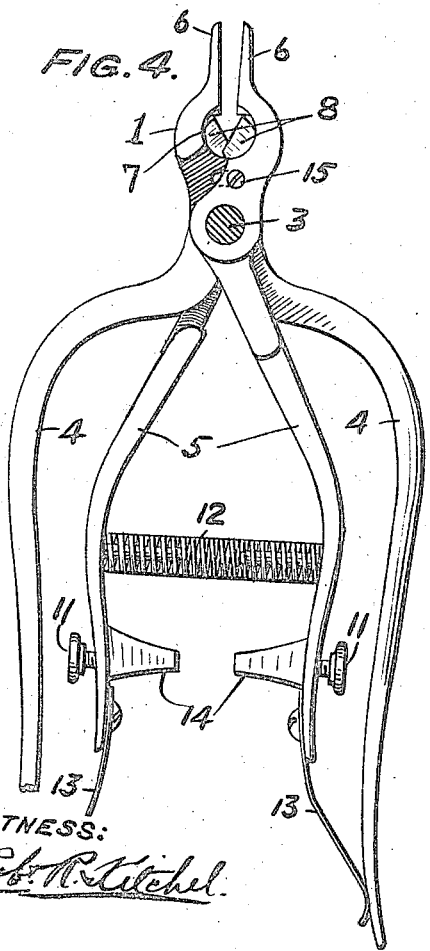
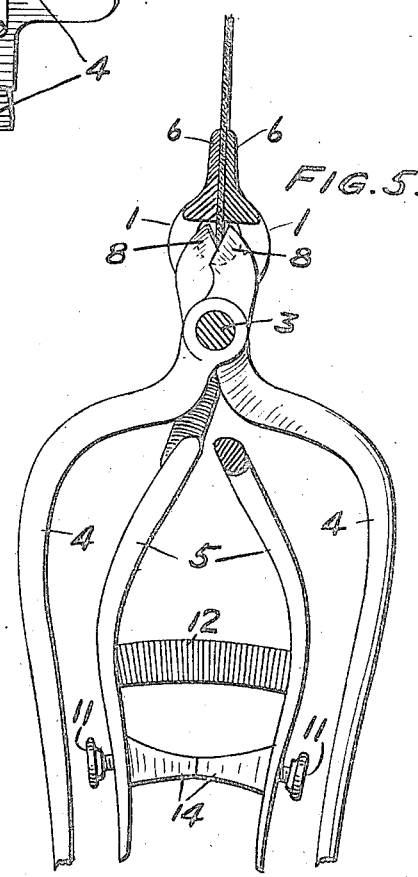

UNITED STATES PATENT OFFICE.

AUGUSTINE B. REPETTO, OF MARGATE CITY, NEW JERSEY.

SAW-SET.

1,239,217.  Specification of Letters Patent.  Patented Sept. 4, 1917.

Application filed August 25, 1916. Serial No. 116,804.

*To all whom it may concern:*

Be it known that I, AUGUSTINE B. REPETTO, a citizen of the United States, and a resident of Margate City, in the county of Atlantic and State of New Jersey, have invented a certain new and useful Saw-Set, of which the following is a specification.

The principal objects of the present invention are to provide a comparatively inexpensive, simple, reliable and compact saw-set which can be used even by unskilled persons for rapidly and accurately setting the teeth of a saw; to provide simple adjustments for the saw-set whereby it can be readily adapted for use in connection with saws having teeth of different pitch and whereby it can be adapted to give the saw teeth any required set or inclination to the general plane of the saw. Other objects will appear from the following description.

Stated in general terms the invention consists of a saw-set comprising the combination of concentrically pivoted pairs of spring-opened clamping and setting tongs having their shanks in substantially the same plane, and of which the clamping tongs are provided with saw holding lips and the setting tongs are provided with saw-sets operatively arranged in respect to the lips, whereby the shanks of the setting tongs constitute handles and operate between them the shanks of the clamping tongs.

The invention further comprises the provision of adjustable abutments between the shanks of the respective tongs for fixing the degree of inclination imparted to the saw teeth, and the invention further comprises the improvements to be presently described and finally claimed.

The accompanying drawings illustrate an embodiment of the invention, and in them—

Figure 1 is a perspective view.

Fig. 2, is a diagrammatic view showing the pivot pin.

Fig. 3, is a front view with parts broken away showing diagrammatically a portion of a saw in position in the tool, and showing the saw sets adjusted to the saw teeth.

Fig. 4, is an end view showing the tongs in open position, and

Fig. 5, is a side view, partly in section, showing the tongs in closed position on a saw and the saw sets in open position about to begin to do their work.

In the drawings 1 are a pair of clamping tongs and 2 are a pair of setting tongs. These pairs of tongs are concentrically pivoted as by means of the pivot pin 3. The shanks 4 and 5 of these tongs are arranged in substantially the same plane. The clamping tongs 1 are provided with saw holding lips 6 between which and the pivot pin 3 a portion is cut away as at 7 to afford clearance for the teeth of a saw. The setting tongs 2 are provided with saw sets 8 operatively arranged in respect to the lips 6; that is, they are arranged between the lips and the pin 3 and in a space provided in the tongs 1. A portion 9 of the pin 3 is threaded, and portions of it are not threaded. One of the setting tong members 2 is tapped and arranged on this threaded portion 9 and the rest of the tong members are arranged on unthreaded portions of the pin, so that by turning the pin the tong members 2, or more accurately the saw sets 8, can be moved toward and away from each other to adjust the set to saws having teeth of different pitch. 10 is a lock nut for holding the tongs 2 in adjusted position. The shanks 4 constitute handles that may be pressed toward each other in the hand of the operator and when they are pressed toward each other they press the shanks 5 between them and so cause the saw sets to move toward each other. 11 are adjustable abutments, shown as screws, and they are interposed between the shanks 4 and 5. By adjusting these abutments the relative movement of the saw sets 8 can be changed so as to give the required inclination or set to the saw teeth. 12 is a spring, shown as interposed between the shanks 5, and it tends to hold the tongs 1 and lips 6 normally in open position. 13 are spring extensions on the shanks 5 and they tend to normally hold the shanks 4 in open position, but they yield to permit of the described operation of the shanks 4 on the shanks 5 through the instrumentality of the adjustable abutments 11. 14 are stops that may be provided on the tongs 5 and they serve to limit the possible range of inward movement of all the shanks. 15 is a stop for limiting the outward movement of the shanks 5. Each element of the tongs 1 is provided with arms 16 and 17 extending from its lips 6 to the pivot pin and spaced apart to accommodate the sets 8. The arm 17 is prolonged past the pivot pin and off-set inward as at 18 so as to bring the shanks 5 in the same general plane as the shanks 4. Whatever movement may be given to one of the members of the tongs 1 by the screw thread on the pin 3 is insufficient to destroy the substantial alinement of the shanks of all of the tongs in substantially the same plane.

In use the saw sets 8 are spaced to accommodate them to the pitch of the teeth of the saw by means of the threaded engagement of one of the tong elements 2 with the threaded portion 9 of the pin and are secured against accidental displacement by the jam or lock-nut 10. The abutments 11 are adjusted so as to provide the proper degree of inclination or set to be imparted to the teeth. This description presupposes that the tool requires adjustment but that may not be the case. To set the teeth of a saw, the set is applied as shown in Fig. 3 and the shanks 4 are pressed toward each other. The first result of this is that spring 12, yields and the lips 6 clamp the saw and so secure the proper positioning of the tool, the spring 13, acting to turn the arms 5, without yielding appreciably, but the spring 12, yields and the arms 4 and 5, maintain substantially the same relative position and the parts 8, come up to their work without actually setting the teeth, see Fig. 5. The tool is moved along the saw and operated in the manner described so setting additional teeth.

It will be obvious to those skilled in the art that modifications may be made in details of construction and arrangement without departing from the spirit of the invention so that the latter is not limited as to those matters or in any way other than the prior state of the art and the appended claims may require.

What I claim is:

1. A saw-set comprising the combination of concentrically pivoted pairs of spring-opened clamping and setting tongs having their shanks in substantially the same plane and of which the clamping tongs are provided with saw holding lips and the setting tongs are provided with saw sets operatively arranged in respect to the lips, whereby the shanks of the setting tongs constitute handles and operate between them the shanks of the clamping tongs, substantially as described.

2. A saw-set comprising the combination of concentrically pivoted pairs of spring-opened clamping and setting tongs having their shanks in substantially the same plane and of which the clamping tongs are provided with saw holding lips and the setting tongs are provided with saw sets operatively arranged in respect to the lips, and adjustable abutments between the shanks of the respective pairs of tongs, whereby the shanks of the setting tongs constitute handles and operate between them the shanks of the clamping tongs, substantially as described.

3. A saw-set comprising the combination of concentrically pivoted pairs of spring-opened clamping and setting tongs having their shanks in substantially the same plane and of which the clamping tongs are provided with saw holding lips and the setting tongs are provided with saw sets operatively arranged in respect to the lips, adjustable abutments between the shanks of the respective pairs of tongs, and stops between the shanks of the clamping tongs, whereby the shanks of the setting tongs constitute handles and operate between them the shanks of the clamping tongs, substantially as described.

4. A saw-set comprising the combination of pairs of spring-opened clamping and setting tongs having their shanks in substantially the same plane and of which the clamping tongs are provided with saw holding lips and the setting tongs are provided with saw sets operatively arranged in respect to the lips, and a pivot pin by which the two pairs of tongs are concentrically pivoted and which has threaded engagement with one element of the pair of setting tongs, substantially as described.

5. A saw-set comprising the combination of a pivot pin, a pair of spring-opened clamping tongs each provided with a clamping lip and with arms spaced apart and extending between the lips and the pin and whereof one is continued beyond the pin and offset to bring the shanks into substantially the same plane, a pair of setting tongs pivoted to said pin and provided with sets arranged in the space between the arms and having their shanks outside of and substantially in the same plane with the shanks of the clamping tongs, and springs and abutments interposed between the shanks of the respective tongs, substantially as described.

AUGUSTINE B. REPETTO.

Copies of this patent may be obtained for five cents each, by addressing the "Commissioner of Patents, Washington, D. C."